(12) United States Patent
Benussi et al.

(10) Patent No.: US 10,958,076 B2
(45) Date of Patent: Mar. 23, 2021

(54) POWER GENERATION AND DISTRIBUTION ARRANGEMENT AND FLOATING UNIT COMPRISING SUCH AN ARRANGEMENT

(71) Applicant: SINGLE BUOY MOORINGS INC., Marly (CH)

(72) Inventors: Marino Benussi, Bât. Aigue Marine (MC); Hendrikus Johannes Tetteroo, Bât. Aigue Marine (MC)

(73) Assignee: SINGLE BUOY MOORINGS INC., Marly (CH)

( * ) Notice: Subject to any disclaimer, the term of this patent is extended or adjusted under 35 U.S.C. 154(b) by 0 days.

(21) Appl. No.: 16/472,711

(22) PCT Filed: Dec. 21, 2017

(86) PCT No.: PCT/EP2017/084156
§ 371 (c)(1),
(2) Date: Jun. 21, 2019

(87) PCT Pub. No.: WO2018/115318
PCT Pub. Date: Jun. 28, 2018

(65) Prior Publication Data
US 2020/0194976 A1    Jun. 18, 2020

(30) Foreign Application Priority Data
Dec. 21, 2016    (EP) .................................... 16205887

(51) Int. Cl.
*H02J 3/38*       (2006.01)
*B63B 35/44*    (2006.01)
(Continued)

(52) U.S. Cl.
CPC ................ *H02J 3/38* (2013.01); *B63B 35/44* (2013.01); *H02B 1/20* (2013.01); *H02B 13/00* (2013.01);
(Continued)

(58) Field of Classification Search
CPC .......... H02J 3/005; H02J 3/007; H02J 3/0073; H02J 3/0075; H02J 3/381; H02J 9/062; H02J 2310/45; H02B 1/20
See application file for complete search history.

(56) References Cited

U.S. PATENT DOCUMENTS 4,357,542 A    11/1982    Kirschbaum et al.
4,724,502 A *    2/1988    Kawahira ................ H02B 1/24
307/19

(Continued)

FOREIGN PATENT DOCUMENTS

EP    1 914 162 A1    4/2008
EP    3 098 923 A1    11/2016
(Continued)

OTHER PUBLICATIONS

International Search Report, dated Aug. 3, 2018, from corresponding PCT application No. PCT/EP2017/084156.
(Continued)

*Primary Examiner* — Thomas J. Hiltunen
(74) *Attorney, Agent, or Firm* — Nixon & Vanderhye

(57) ABSTRACT

A power generation and distribution arrangement that includes at least three switchgear sections. Each switchgear includes at least one or more power generators and an internal busbar in which the one or more power generators are electrically connected to the internal busbar. The internal busbar of each switchgear has one connecting end that is electrically connected to a common conductive node of the arrangement. The common conductive node includes an external interconnecting busbar between the switchgear sections.

10 Claims, 3 Drawing Sheets

(51) Int. Cl.
*H02B 1/20* (2006.01)
*H02B 13/00* (2006.01)
*H02J 3/00* (2006.01)
*H02J 9/06* (2006.01)

(52) U.S. Cl.
CPC ............ *H02J 3/007* (2020.01); *H02J 3/0073* (2020.01); *H02J 3/0075* (2020.01); *H02J 3/381* (2013.01); *H02J 9/062* (2013.01); *B63B 2035/448* (2013.01); *B63B 2035/4433* (2013.01)

(56) References Cited

U.S. PATENT DOCUMENTS

| | | | | |
|---|---|---|---|---|
| 6,147,845 | A * | 11/2000 | Matsubara | H02H 7/267 307/86 |
| 7,121,905 | B2 * | 10/2006 | Rzadki | H02J 4/00 440/3 |
| 7,544,108 | B2 * | 6/2009 | Rzadki | B63H 21/17 440/6 |
| 7,960,948 | B2 * | 6/2011 | Saban | H02K 11/33 322/89 |
| 8,816,631 | B2 * | 8/2014 | Wei | H02M 7/125 318/722 |
| 10,608,427 | B2 * | 3/2020 | Lindtjorn | B63H 23/24 |
| 2010/0284117 | A1 | 11/2010 | Crane | |
| 2013/0270902 | A1 * | 10/2013 | Andersen | B60R 16/03 307/9.1 |
| 2014/0240880 | A1 * | 8/2014 | Chen | H02H 7/22 361/62 |
| 2016/0352105 | A1 | 12/2016 | Tiwari et al. | |
| 2017/0306928 | A1 | 10/2017 | Tahata et al. | |
| 2017/0373498 | A1 * | 12/2017 | Haugan | H02H 3/26 |
| 2019/0118960 | A1 * | 4/2019 | Izquierdo Gil | H02J 3/38 |

FOREIGN PATENT DOCUMENTS

| | | |
|---|---|---|
| GB | 2 474 056 A | 4/2011 |
| WO | 2016/042601 A1 | 3/2016 |

OTHER PUBLICATIONS

Written Opinion, dated Aug. 3, 2018, from corresponding PCT application No. PCT/EP2017/084156.
International Preliminary Report on Patentability (PCT/IPEA/409) dated Feb. 26, 2019, by the Netherlands Patent Office as the International Preliminary Examining Authority for International Application No. PCT/EP2017/084156.

* cited by examiner

POWER GENERATION AND DISTRIBUTION ARRANGEMENT AND FLOATING UNIT COMPRISING SUCH AN ARRANGEMENT

FIELD OF THE INVENTION

The present invention relates to a power generation and distribution arrangement. Additionally, the invention relates to a marine installation or floating unit comprising such a power generation and distribution arrangement.

BACKGROUND

In prior art power generation and distribution installations on floating units or marine installations, switchgears of the power generation and distribution arrangement are typically connected in series via a switch. Such switchgear is a combination of electrical switches, and circuit breakers that is arranged to control a connection between a power source (a power generator) and consuming devices or electric power consumers. The switchgear comprises an internal busbar and is electrically connected to at least one or more power generators and user electrical equipment, wherein the one or more power generators and the electric power consumers are electrically connected to the internal busbar. Typically, prior art electrical installations use a voltage up to 15 kV, due to classification requirements for electrical equipment for marine applications.

As more electrical equipment is installed on marine installations and their power demand is growing, the power output of such electrical installations on board of large oil and gas production installations is now reaching and even surpassing limits.

As a result, there is a need to increase the power generation of such installations. An increase could be achieved by various options, such as to select a higher voltage or to install the switchgears/generators in two or more independent "islands" or to daisy chain the power generators or the switchgears. In all these options the generated power is increased.

To increase the output voltage of the power generators to levels above the classification voltage, would require installation of step-up transformers to an high voltage which allows switching of currents suitable for the commercially available equipment and step-down transformers to produce operating voltage for the installed electric power consumers. Also, the transformers would occupy additional space on board the marine installation and add significant weight to the overall electrical installation.

Installing the switchgears/generators in two or more independent islands would require that spare power generators are available in each "island".

To daisy chain the power generators or to daisy chain the switchgears has a disadvantage in that the switchgears and power generators are limited in their short circuit levels and current carrying capacity. A short circuit in one of the daisy-chained switchgears causes high currents also in the other switchgears in the series connection. This may even cause that a properly functioning switchgear is overloaded by the high current flowing through to the short-circuited switchgear, exceeding its short-circuit rating, and becomes inoperative.

It is an object of the present invention to provide a power generation and distribution arrangement that overcomes or mitigates the above detrimental effects.

SUMMARY OF THE INVENTION

The above object is achieved by a power generation and distribution arrangement comprising at least three switchgears and at least one power generator associated with each switchgear, each switchgear comprising an internal busbar, wherein the at least one power generators are electrically connected to the internal busbar of the associated switchgear, wherein the internal busbar of each switchgear has one connecting end that is electrically connected to a common conductive node of the arrangement.

By providing that all switchgears are connected in a common conductive node of the arrangement, load sharing between the power generators coupled to each of the switchgears is possible: any allowable current that may flow between two individual switchgears flows through a direct connection between the two individual switchgears. In addition the arrangement provides that current between any pair of switchgears can flow without affecting any other switchgear in the arrangement. As a result, the risk of overloading a properly functioning switchgear is significantly reduced.

According to an aspect, the invention provides the power generation and distribution arrangement as defined above, wherein the common conductive node comprises an interconnecting busbar.

By using the interconnecting busbar as common node for the interconnection, a spatial arrangement of the switchgears can be optimized.

According to an aspect, the invention provides the power generation and distribution arrangement as defined above, wherein between the connecting end of the internal busbar and the common conductive node an intermediate coupling is arranged.

The intermediate coupling at the connecting end of the switchgear allows to switch off and disconnect the switchgear, in case of maintenance or malfunction.

According to an aspect, the invention provides the power generation and distribution arrangement as defined above, wherein the intermediate coupling comprises a circuit breaker.

By using a circuit breaker for coupling, the switchgears can be disconnected when the circuit breaker is overloaded, i.e., when the switchgear comprising the circuit breaker requests more than the current rated by the circuit breaker from the other switchgears in the power generation and distribution arrangement. This may prevent damage to the other switchgears in case the switchgear comprising the circuit breaker is overloaded or short circuited.

According to an aspect, the invention provides the power generation and distribution arrangement as defined above, wherein the intermediate coupling comprises a current limiting device. The current limiting device of the switchgear provides that the current tapped from the other switchgears is limited to an allowable level for these other switchgears.

According to an aspect, the invention provides the power generation and distribution arrangement as defined above, wherein in the intermediate coupling the circuit breaker is arranged between the internal busbar and the current limiting device.

By arranging the circuit breaker between the internal busbar and the current limiting device, it is prevented that the short circuit rating of the switchgear comprising the current limiting device, is exceeded thanks to the action of the current limiting device. Also by offering coordination between current limiting devices, it is possible to have not more than one device tripping and isolating only the switchgear with the fault.

According to an aspect, the invention provides the power generation and distribution arrangement as defined above, wherein in the intermediate coupling the current limiting device is arranged between the circuit breaker and the internal busbar.

According to an aspect, the invention provides the power generation and distribution arrangement as defined above, wherein at least one additional power generator is directly coupled to the common conductive node of the arrangement.

Such an additional power generator can provide additional power to any of the switchgears connected to the common conductive node, and can thus reduce any current flowing between switchgears.

According to an aspect, the invention provides the power generation and distribution arrangement as defined above, wherein the power generators are each driven by a gas turbine.

According to an aspect, the invention provides the power generation and distribution arrangement as defined above, wherein at least one of the switchgears additionally comprises a power generator driven by a steam turbine.

By combining a gas turbine driven power generator with a steam turbine driven power generator, thermal energy from the gas turbine exhaust can be fed to a boiler to produce steam used as energy source for the steam turbine.

According to an aspect, the invention provides the power generation and distribution arrangement as defined above, wherein each switchgear additionally comprises a plurality of energy consumer devices. Such energy consumer devices relate to electric power consumers such as motors, transformers, converters, and other utility equipment.

According to an aspect, the invention provides the power generation and distribution arrangement as defined above, wherein the interconnecting busbar has a maximum rating of about 8000 Ampère at an AC voltage in a range of about 11 kV-about 15 kV.

According to an aspect, the invention provides the power generation and distribution arrangement as defined above, wherein the current limiting device has a maximum rating of 4000 Ampère at an AC voltage in a range of about 11 kV-about 15 kV.

According to an aspect, the invention provides the power generation and distribution arrangement as defined above, wherein the power generation and distribution arrangement is configured for generating and distributing between 90 and 250 MW of electrical power.

According to an aspect, the invention provides a power generation and distribution arrangement, that is arranged for installation on a marine installation. Such marine installation may be a vessel, semi-submersible, tension-leg platform (TLP), spar structure or jacket structure.

According to an aspect, the invention provides the power generation and distribution arrangement as defined above, that is arranged for installation on an offshore oil and/or gas extraction facility, or a floating (production) storage and offloading vessel or a floating liquefied natural gas facility.

According to an aspect, the invention provides a marine installation comprising the power generation and distribution arrangement as defined above, wherein the marine installation is a floating production storage and offloading unit or a floating storage and offloading unit or a floating liquefied natural gas unit.

Advantageous embodiments are further defined by the dependent claims.

BRIEF DESCRIPTION OF DRAWINGS

The invention will be explained in more detail below with reference to drawings in which illustrative embodiments thereof are shown. They are intended exclusively for illustrative purposes and not to restrict the inventive concept, which is defined by the appended claims.

DETAILED DESCRIPTION OF EMBODIMENTS

Figure 1:
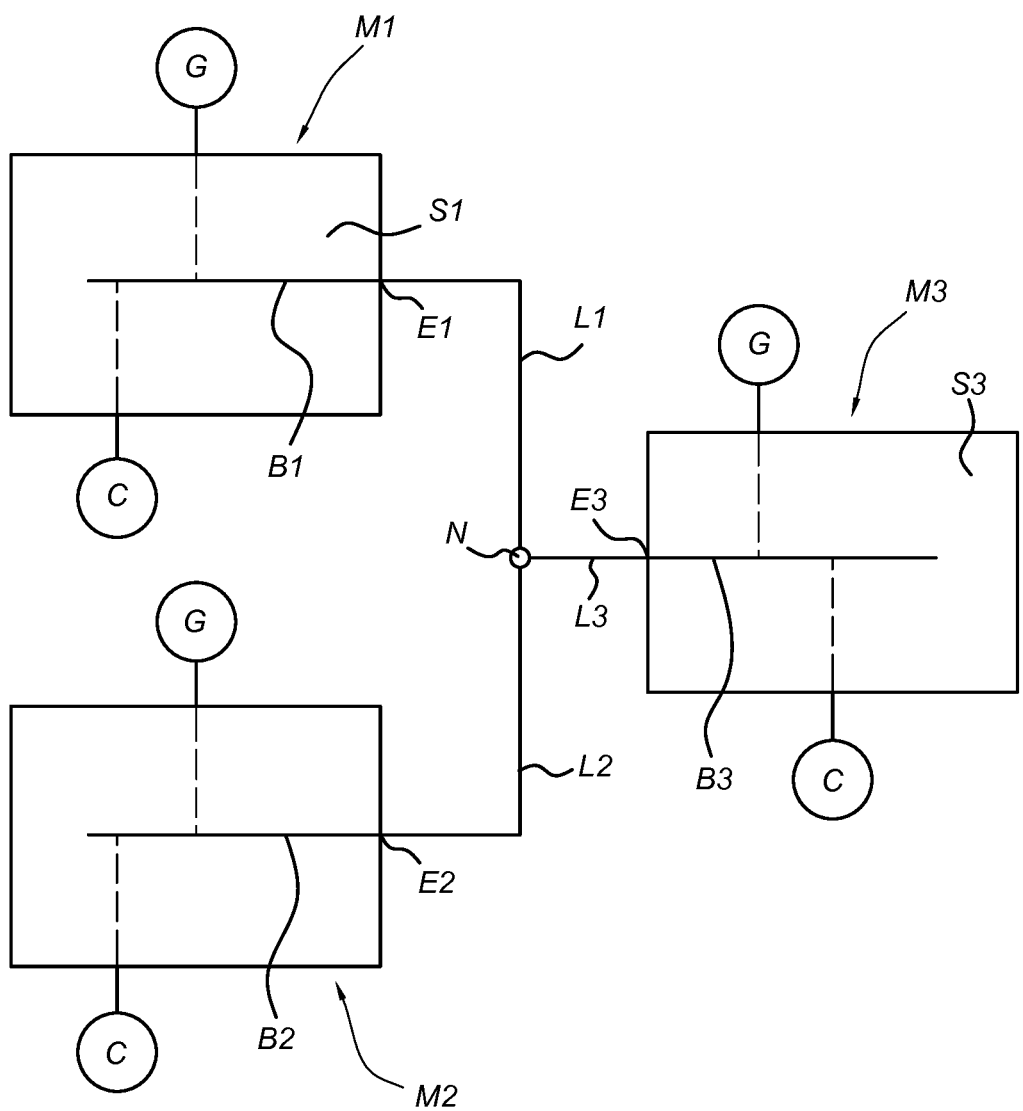
FIG. 1 shows a schematic layout of a power generation and distribution arrangement in accordance with the present invention.

FIG. 1 shows a schematic layout of a power generation and distribution arrangement in accordance with the present invention.

The power generation and distribution arrangement comprises at least three power distribution modules M1, M2, M3. Each power distribution module M1; M2; M3 comprises a switchgear (section) S1; S2; S3, at least one power generator G and electric power consumers C.

Within each power distribution module, the switchgear is arranged to provide an electrical coupling between the at least one power generator G and the electric power consumers installed on the power distribution module. The electrical coupling comprises at least a network of switches and circuit breakers that allow to switch the power generator and/or electric power consumers. Typically, the switchgears each comprise an internal busbar B1; B2; B3 for distributing the power generated by the at least one power generator to the electric power consumers via the network.

According to the invention, the power distribution modules are interconnected in a point or "star" connection, by connecting a connecting end E1; E2; E3 of the respective busbar B1; B2; B3 to a common conductive node N through a connector line L1; L2; L3.

By providing a star connection between the power distribution modules load sharing between the power distribution modules can occur through the common conductive node, depending on the actual balance between power generation in the power generator(s) and power consumption by electric power consumers in each power distribution module. A power distribution module that temporarily consumes more power than generated, can receive power from another power distribution module that has a power surplus substantially without affecting other power distribution modules in the star connection.

Figure 2:
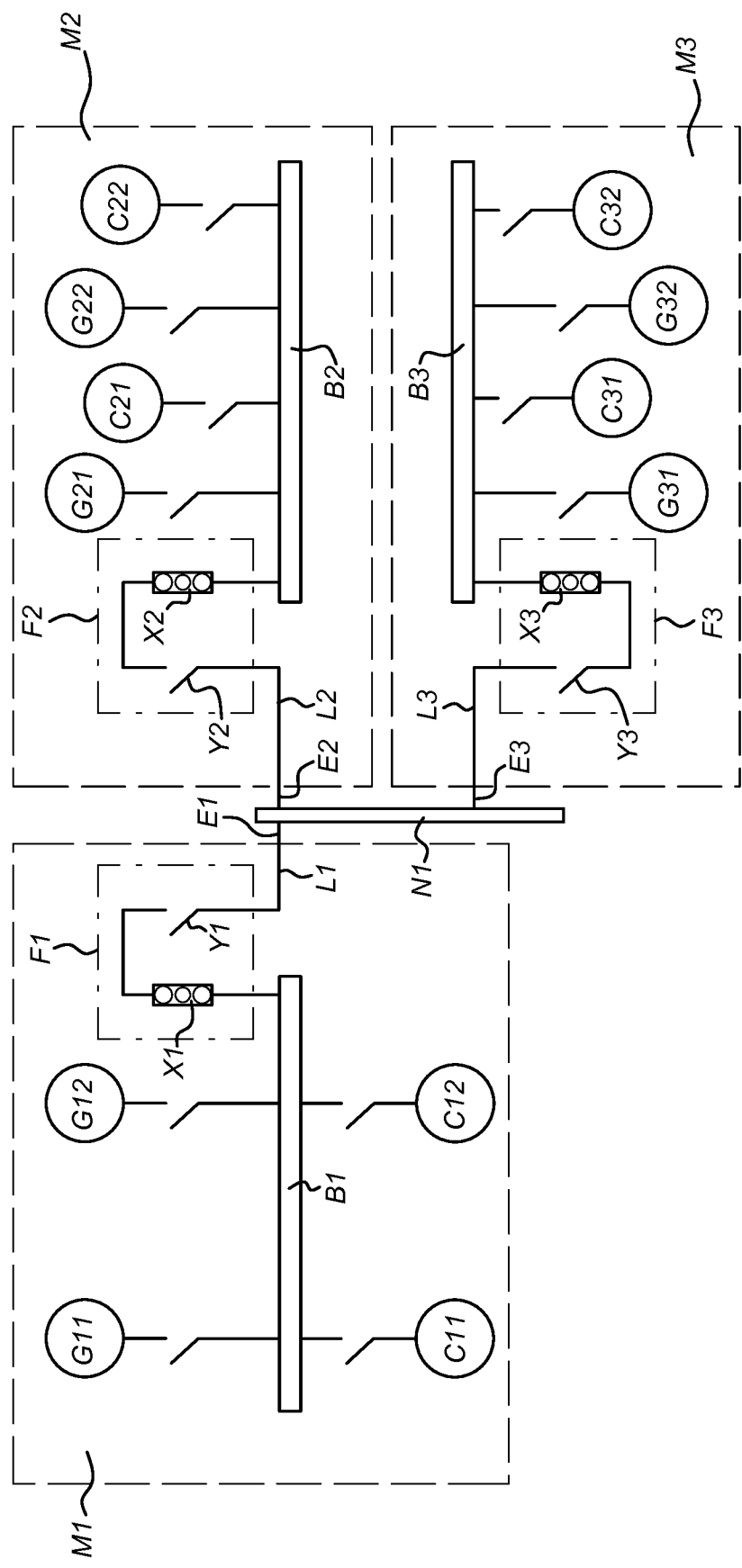
FIG. 2 shows a schematic layout of a power generation and distribution arrangement according to an embodiment of the invention.

FIG. 2 shows a schematic layout of a power generation and distribution arrangement according to an embodiment of the invention.

In FIG. 2 elements with the same reference number as shown in FIG. 1 refer to corresponding or similar elements.

According to this embodiment, the at least three power distribution modules M1; M2; M3 are interconnected at their respective connecting ends E1; E2; E3 by an (external) interconnecting busbar N1 between the switchgears that functions as common conductive node.

Each power distribution module M1; M2; M3 comprises power generators G11, G12; G21, G22; G31, G32, an internal busbar B1; B2; B3 and electric power consumers C11, C12; C21, C22; C31, C32. Both the power generators and the electric power consumers are electrically coupled to the internal busbar by the switchgear network devices. In each power distribution module M1; M2; M3 inbetween the connecting end E1; E2; E3 of the internal busbar B1; B2; B3 and the interconnecting busbar N1 an intermediate coupling F1; F2; F3 is arranged.

The intermediate coupling F1; F2; F3 comprises a switch Y1; Y2; Y3 and a current limiting device X1; X2; X3.

The current limiting device X1; X2; X3 functions as a current limiting device for limiting the short circuit current to a maximum current flowing from the interconnecting busbar N1 to (the internal busbar of) the power distribution module.

According to an embodiment, the circuit breaker Y1; Y2; Y3 is implemented for switching off the connection to the interconnecting busbar N1. The circuit breaker is configured to break larger than rated currents and thus protect the equipment, in this case to break the switchgear from the interconnecting busbar N1.

In the combination of current limiting device and circuit breaker in each power distribution module, the current limiting device has a current rating typically the same as the current rating of the switch.

In an embodiment, the current rating of the circuit breaker Y1; Y2; Y3 is 4000 Ampère, and the current rating of the current limiting device X1; X2; X3 is 4000 Ampère.

In case of a short circuit in one power distribution module, for example power distribution module M1, the other power distribution modules M2; M3 are limited by the current limiting device from M1 to prevent internal damage. The current limiting device of the short circuited power distribution module M1 will be activated since the current through the interconnecting busbar N1 will carry the currents from both power distribution modules M2; M3. The current rating of the interconnecting busbar N1 is typically has the same current rating as the current rating of the individual switchgear.

If the current rating of the current limiting device of the switchgear is for example 4000 Ampère, the current rating of the interconnecting busbar N1 is 4000 Ampère.

In this manner, the fuse of the short-circuited power distribution module will break and isolate the module from the other power distribution modules M2, M3. Under practical circumstances, the operating voltage of the power generators G11, G12; G21, G22; G31, G32 can be for example about 11 kV AC or about 13.8 kV AC.

In case of an operating voltage of 11 kV AC, the apparent power of one switchgear section is rated at about 76 MVA. At 13.8 kV the apparent power is about 96 MVA. It is noted that the total apparent load of electric power consumers connected to one switchgear must not exceed the switchgear rated apparent power.

By following these criteria, no busbar is ever overloaded.

Figure 3:
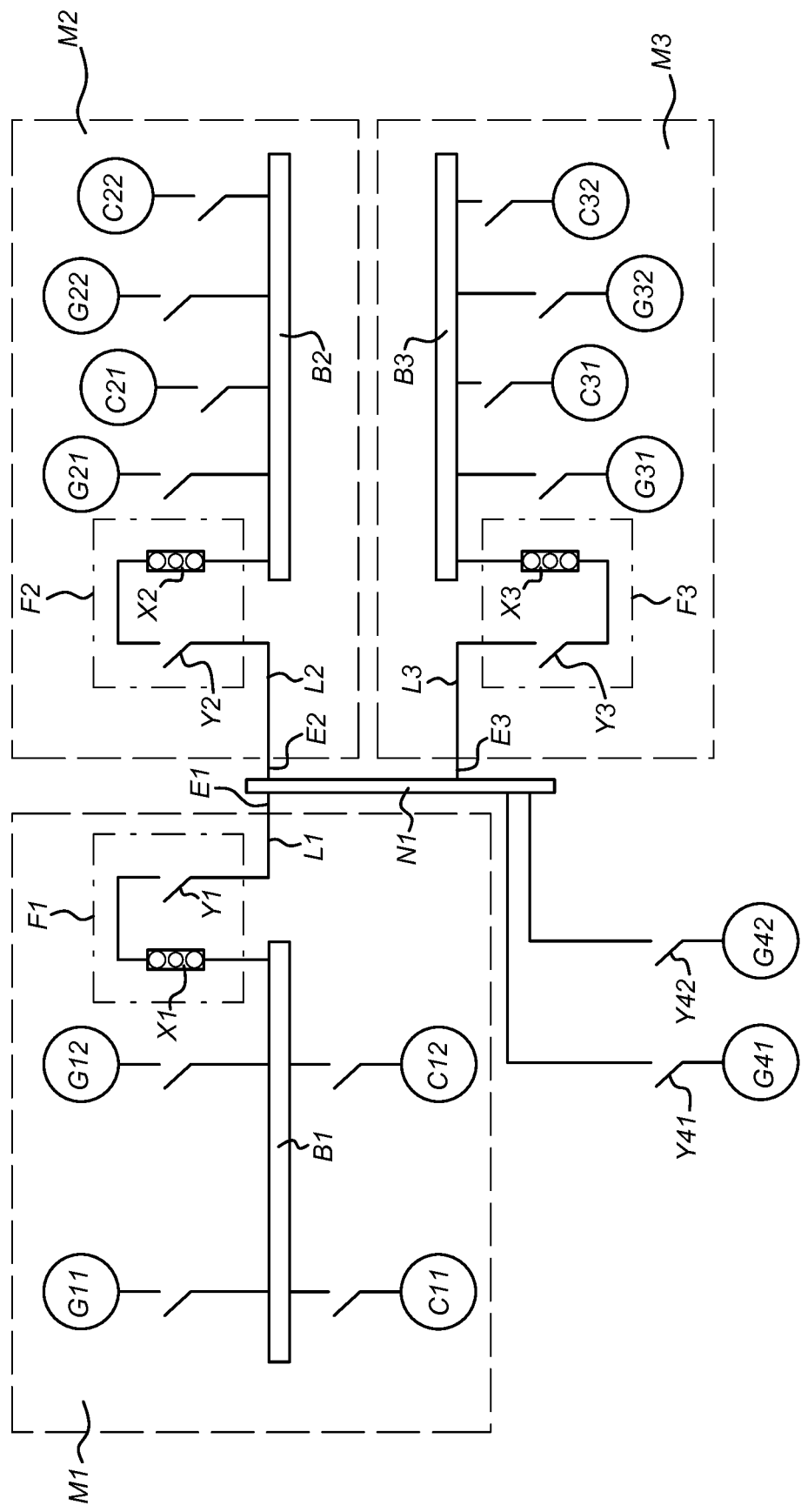
FIG. 3 shows a schematic layout of a power generation and distribution arrangement according to an embodiment of the invention.

FIG. 3 shows a schematic layout of a power generation and distribution arrangement according to an embodiment of the invention.

In FIG. 3 elements with the same reference number as shown in FIG. 1 and FIG. 2 refer to corresponding or similar elements.

The embodiment shown in FIG. 3 is similar to the embodiment of FIG. 2, but additionally comprises one or more additional power generators G41, G42 that are directly coupled to the interconnecting busbar N1 through a respective local circuit breaker Y41, Y42.

In this manner, additional power can be provided to the installed power distribution modules M1; M2; M3. This arrangement can be useful for example in case, power generators are used in the power distribution modules that have a relatively low voltage or power rating. According to the embodiment, the additional power generators G41, G42 supply power over the interconnecting busbar N1 to electric power consumers in one or more of the at least three power distribution modules.

Similarly as in the other embodiment, the power generation and distribution arrangement provides the same mechanism against short circuit as described above. In addition, the local circuit breaker Y41, Y42 have a lower rating than the circuit breakers Y1; Y2; Y3 of the power distribution modules M1; M2, M3.

It is noted that if one of the additional power generators G41; G42 would short circuit, then the local circuit breaker Y41; Y42 will break before any of the circuit breakers Y1; Y2; Y3 of the power distribution modules.

The actual positions of the separate power distribution modules in the power generation and distribution arrangement will be given by selecting layout and length of the connector lines L1, L2, L3 as will be appreciated by the person skilled in the art.

According to an embodiment, the operating voltage of the power generators G11, G12; G21, G22; G31, G32; G41, G42 is about 11 kV AC with a power of 36 MVA per generator. The current rating of the circuit breaker Y1; Y2; Y3 or current limiting device X1; X2; X3 of the switchgear is for example 4000 Ampère, the current rating of the interconnecting busbar N1 is 8000 Ampère. The additional power generators G41, G42 are connected over local circuit breaker Y41; Y42 with a rating of 2000 Ampère per additional power generator. In this manner, the combination of additional power generators has a same rating as the individual switchgears.

According to the invention, each switchgear includes electric power consumers, i.e., consumers (motors, transformers, converters, etc.), a number of generators and an import/export link to the other sections via the "star" point, the common conductive node.

Preferably consumers which are part of a same system should be distributed between sections (e.g. 3×50% A-B-C pumps, each connected to a section).

The total apparent load of the consumers connected to a section must not exceed the switchgear rated apparent power (e.g. 76 MVA for a 11 kV, 4000 A rated switchgear and. 96 MVA for a 13.8 kV, 4000 A rated switchgear).

By following the above criteria, no busbar is ever overloaded.

The generators connected to a switchgear section provide power to the consumers of that section, within their capability; if a generator is not operating, power generated in a section may be insufficient and power is imported from the other sections over the common conductive node, i.e., the interconnecting busbar. On the other hand, if the generating capacity in one switchgear section is not fully utilised by the consumers of that section, power may be exported to other sections, where there is a shortage of generated power versus consumed power. Power generators may share load equally regardless of the loads distribution across the switchgear sections.

Each switchgear section is verified for short circuit rating by taking into consideration the generator's short circuit contribution, load short circuit contribution and any contribution through the short circuit limiting devices (if applicable).

In case of short circuit in one switchgear section (generator, consumer, cable, etc.), the short circuit rating of that switchgear section is not exceeded thanks to the action of the current limiting devices; where coordination between current limiting devices is offered, it is possible to have not more than one fuse tripping and isolating the switchgear section with the short circuit fault.

Other alternatives and equivalent embodiments of the present invention are conceivable within the idea of the invention, as will be clear to the person skilled in the art. The scope of the invention is limited only by the appended claims.

The invention claimed is:

1. An AC power generation and distribution arrangement comprising:
   at least three power distribution modules (M1, M2, M3), each power distribution module comprising a switchgear (S1; S2; S3), and each switchgear configured for electrical connection to at least one AC power generator (G11, G12; G21; G22; G31, G32) and/or to at least one power consumer (C11; C12; C21; C22; C31; C32),
   each switchgear (S1; S2; S3) comprising an internal busbar (B1; B2; B3) for distributing power generated by a connected at least one power generator to a connected at least one power consumer, wherein the at least one AC power generator (G11, G12; G21, G22; G31, G32) is electrically connected in AC mode by a network of switches and circuit breakers to the internal busbar (B1; B2; B3) of the associated switchgear (S1; S2; S3),
   wherein the internal busbar (B1, B2, B3) of each switchgear (S1; S2; S3) has one connecting end (E1; E2; E3) that is electrically connected to a common conductive node, which common conductive node is an interconnecting busbar (N1) between the switchgears (S1, S2, S3) of the at least three power distribution modules (M1, M2, M3); and
   an intermediate coupling (F1; F2; F3) arranged between the connecting end (E1; E2; E3) of the internal busbar (B1; B2; B3) of each switchgear (S1; S2; S3) and the interconnecting busbar (N1)
   wherein each intermediate coupling (F1; F2; F3) comprises a current limiting device (X1; X2; X3) and a circuit breaker (Y1; Y2; Y3), and
   wherein at least one additional AC power generator is directly coupled to the common conductive node of the arrangement.

2. The AC power generation and distribution arrangement according to claim 1, wherein in the intermediate coupling the current limiting device is arranged between the internal busbar and the circuit breaker.

3. The AC power generation and distribution arrangement according to claim 1, wherein in the intermediate coupling the circuit breaker is arranged between the internal busbar and the current limiting device.

4. The AC power generation and distribution arrangement according to claim 1, wherein the AC power generators are each driven by a gas turbine.

5. The AC power generation and distribution arrangement according to claim 4, wherein at least one of the switchgears additionally comprises an AC power generator driven by either a steam turbine or a diesel engine.

6. The AC power generation and distribution arrangement according to claim 1, wherein the interconnecting busbar has a maximum rating of about 8000 Ampère at an AC voltage in a range of about 11 kV-about 15 kV.

7. The AC power generation and distribution arrangement according to claim 1, wherein the circuit breaker has a rating of 4000 Ampere at an AC voltage in a range of about 11 kV-about 15 kV, and/or the current limiting device has a rating of 4000 Ampere at an AC voltage in a range of about 11 kV-about 15 kV.

8. The AC power generation and distribution arrangement according to claim 1, wherein the AC power generation and distribution arrangement is configured for generating and distributing between about 90 and 250 MW electrical power.

9. A marine installation comprising an AC power generation and distribution arrangement according to claim 1.

10. The marine installation according to claim 9, wherein the marine installation is either an offshore oil and/or gas extraction facility, or a floating production storage and offloading unit or a floating storage and offloading unit or a floating liquefied natural gas unit.

* * * * *